J. H. HAMMOND, Jr.
METHOD OF SELECTIVE ELECTRIC WAVE SIGNALING.
APPLICATION FILED APR. 27, 1912. RENEWED DEC. 28, 1917.
1,274,264.      Patented July 30, 1918.
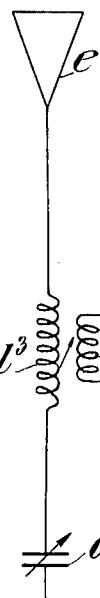
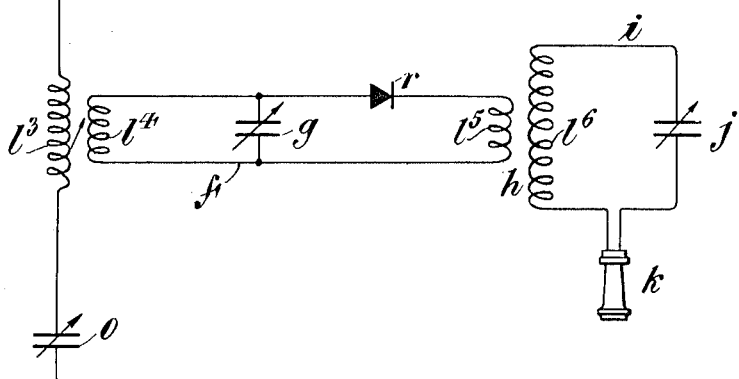
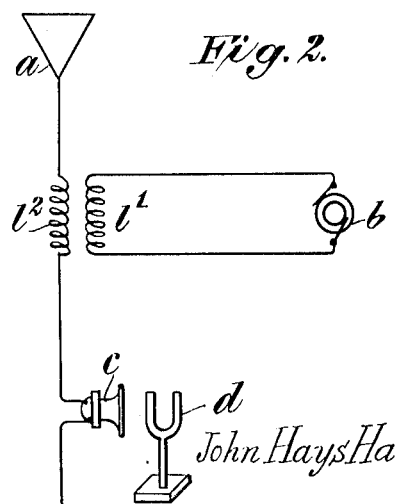
John Hays Hammond, Jr.
INVENTOR
BY
Messimer & Austin ATTORNEY
WITNESSES

UNITED STATES PATENT OFFICE.

JOHN HAYS HAMMOND, JR., OF GLOUCESTER, MASSACHUSETTS.

METHOD OF SELECTIVE ELECTRIC-WAVE SIGNALING.

1,274,264.     Specification of Letters Patent.     Patented July 30, 1918.

Application filed April 27, 1912, Serial No. 693,765. Renewed December 28, 1917. Serial No. 209,377.

*To all whom it may concern:*

Be it known that I, JOHN HAYS HAMMOND, Jr., a citizen of the United States, residing at Gloucester, in the State of Massachusetts, have invented certain new and useful Improvements in Methods of Selective Electric-Wave Signaling, of which the following is a specification.

This invention relates particularly to a system of selective signaling with undamped waves of periodically varying amplitude, and the invention consists properly in periodically varying the amplitude of undamped waves emitted at the sending station, and in providing a receiving station with means which shall be non-responsive to any vibrations except those having predetermined amplitude variations.

The invention further consists in the new and novel features and construction and combination of parts hereinafter set forth and claimed.

In the accompanying drawings—

Figure 1 represents diagramatically one form of apparatus embodying my invention adapted for use at the receiving station.

Fig. 2 represents diagrammatically one form of apparatus adapted for use at the sending station.

Referring to the accompanying drawings, and particularly to Fig. 2 thereof, the antenna circuit $a$ is coupled with a suitable source of energy such as a high frequency alternator $b$. Said antenna circuit comprises a suitable means for producing periodic fluctuations of amplitude in the emitted waves such, for example, as a transmitter $c$. Periodic changes in the resistance of this transmitter may be produced by any suitable means such as the tuning fork $d$.

In Fig. 1 the receiving antenna $e$ is in resonance with the sending antenna $a$, and is inductively coupled to a closed oscillatory circuit $f$ comprising a variable condenser $g$ and a rectifying detector $r$. Said circuit $f$ is also inductively coupled as at $h$ with an oscillatory circuit $i$ comprising a variable condenser $j$. Said circuit $i$ is also provided with a suitable current indicator such as a telephone $k$.

By causing changes in the resistance of the transmitter $c$ by the action of the vibrating body $d$, the amplitude of the high frequency waves emitted by the sending antenna $a$ will be periodically varied, and since the receiving antenna is in resonance therewith, periodic high frequency currents will be developed in the receiving antenna circuit $e$, having periodic vibrations determined by the mechanical vibration period of the vibrating body or tuning fork $d$. The circuit $f$ may be tuned by means of the variable condenser $g$ to a predetermined frequency of the receiving antenna circuit, but the rectifying detector $r$ permits only unidirectional current to pass through the inductance $l^5$. The circuit $i$ in turn may be tuned by the variable condenser $j$ to the amplitude frequency produced by the transmitter $c$, and consequently will respond thereto.

By means of my improved method it will be obvious that a double selectivity is obtained resulting from the tuning of the circuit $f$ to high frequency oscillations and of the circuit $i$ to low frequency oscillations. Consequently interference cannot occur unless the periodicity of the waves emitted from the generator at the sending station and also the mechanical vibration periods of the transmitter are duplicated.

In the art, it is well known that in order to attain efficient tuning it is necessary to have circuits whose electrical oscillation is persistent and slowly dampened. Therefore, in all cases where I have shown detectors it may be understood that I may employ such detecting devices as present the least ohmic resistance in a circuit. Moreover, by means well known in the art, the interconnection of the oscillating circuits may be made to produce an amplification effect of the energy transmitted through them, rather than to suffer a direct loss due to the resistance of the circuits.

Although the particular apparatus shown in the drawings is particularly adapted to the transmission of audible signals, it is obvious that the received energy can be utilized for the selective operation of suitable mechanical arrangements and devices, and it is also obvious that the invention may be advantageously employed in various other means of energy transmission.

I do not confine myself to the particular means here shown for varying the amplitude of the waves at the transmitting station, but I may also use other means which I have shown in other applications for U. S. Letters Patent, or which are already well known in the art.

But what I claim as my invention is:

1. The method of receiving continuous waves of radiant energy having a given wave frequency and a regular periodic variation in amplitude, which consists in first causing said radiant energy to produce a unidirectional pulsating current having a wave frequency determined by the wave frequency of the received radiant energy and having a regular periodic variation in amplitude having a frequency determined by the frequency of the periodic variation of the received radiant energy, and then producing from said pulsating current an electric current having an amplitude variation of a frequency determined by the frequency of said periodic variations.

2. The method of receiving continuous waves of radiant energy having a given wave frequency and a regular periodic variation in amplitude, which consists in first causing said radiant energy to produce a unidirectional pulsating current having a wave frequency determined by the wave frequency of the received radiant energy and having a regular periodic variation in amplitude having a frequency determined by the frequency of the periodic variation of the received radiant energy, and then inductively producing from said pulsating current an electric current having an amplitude variation of a frequency determined by the frequency of said periodic variations.

This specification signed and witnessed this 23rd day of April, A. D. 1912.

JOHN HAYS HAMMOND, Jr.

Signed in the presence of—
 BENJ. F. MIESSNER,
 M. P. WINNE.